(12) United States Patent
San Pedro Perez et al.

(10) Patent No.: US 11,208,196 B2
(45) Date of Patent: Dec. 28, 2021

(54) AERODYNAMIC SURFACE FOR AN AIRCRAFT

(71) Applicant: Airbus Operations, S.L., Getafe (ES)

(72) Inventors: Jesus San Pedro Perez, Getafe (ES); Bibiana Masia Cabañes, Getafe (ES); Alberto Sanchez Lopez, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 89 days.

(21) Appl. No.: 16/713,188

(22) Filed: Dec. 13, 2019

(65) Prior Publication Data
US 2020/0189718 A1 Jun. 18, 2020

(30) Foreign Application Priority Data

Dec. 17, 2018 (EP) .................................. 18382931

(51) Int. Cl.
*B64C 9/30* (2006.01)
*B64C 9/04* (2006.01)
*B64C 3/18* (2006.01)

(52) U.S. Cl.
CPC .................. *B64C 9/30* (2013.01); *B64C 9/04* (2013.01); *B64C 3/185* (2013.01)

(58) Field of Classification Search
CPC .............. B64C 9/30; B64C 9/04; B64C 3/185
See application file for complete search history.

(56) References Cited

U.S. PATENT DOCUMENTS

| | | | | |
|---|---|---|---|---|
| 2,556,351 A | * | 6/1951 | Tulley | B64C 9/30 244/99.13 |
| 2,575,532 A | * | 11/1951 | Sears | B64C 9/00 244/82 |
| 2,859,925 A | * | 11/1958 | Gerin | B64C 9/30 244/99.13 |
| 6,257,528 B1 | * | 7/2001 | Brislawn | B63H 25/381 244/211 |
| 2008/0149762 A1 | * | 6/2008 | Baker | B64C 5/02 244/87 |
| 2017/0320561 A1 | * | 11/2017 | Garcia Nieto | B64C 9/02 |

FOREIGN PATENT DOCUMENTS

| | | |
|---|---|---|
| EP | 3241742 A1 | 11/2017 |
| RU | 393616 A1 | 7/1996 |

OTHER PUBLICATIONS

European Search Report; priority document.

* cited by examiner

*Primary Examiner* — Justin M Benedik
(74) *Attorney, Agent, or Firm* — Greer, Burns & Crain, Ltd.

(57) ABSTRACT

An aerodynamic surface for an aircraft, comprising a torsion box, a movable control surface, and a central element, the torsion box comprising a rear spar, upper and lower covers, and the movable control surface comprising a leading edge, a front spar, a hinge line, a beam having a first end and a second end, and a counterweight attached to the second end of the beam. The first end of the beam is attached to the front spar, and the second end is projected beyond at least the hinge line so that the counterweight is arranged between the upper and lower covers extending from the rear spar of the torsion box towards the movable control surface.

9 Claims, 3 Drawing Sheets

AERODYNAMIC SURFACE FOR AN AIRCRAFT

CROSS-REFERENCES TO RELATED APPLICATIONS

This application claims the benefit of the European patent application No. 18382931.6 filed on Dec. 17, 2018, the entire disclosures of which are incorporated herein by way of reference.

FIELD OF THE INVENTION

The present invention refers to an aerodynamic surface for an aircraft, in particular, a horizontal tail plane, a vertical tail plane, or a wing.

One object of the present invention is to provide an aerodynamic surface adapted to improve the flutter behavior of an aircraft.

Another object of the present invention is to provide an aerodynamic surface with dead mass reduction, to thus decrease related operational costs.

It is also an object of the present invention to provide an aerodynamic surface that can be mounted on existing aircraft without the need of developing a redesign process.

The invention also refers to an aircraft comprising such an aerodynamic surface.

BACKGROUND OF THE INVENTION

A control surface is a movable element which is intended for modifying the aerodynamic profile of an aerodynamic surface, such as a wing, a horizontal or a vertical tail plane. Aerodynamic forces exerted on the aerodynamic surface are modified when the aerodynamic profile of the surface changes, providing more or less lift. So, when the control surface is deflected downwards, the aerodynamic profile is changed in such way that the lift force is increased, while when the control surface is deflected upwards, the lift force decreases. Then, controlling the operation of the aircraft is possible by adjusting the position of the control surfaces.

The aerodynamic surface has a hinge line for allowing the control surface to rotate to thus provide more or less lift force. When rotating, the control surface could contribute to an aeroelastic instability called flutter. Aircraft flutter is a dynamic instability caused by the interaction between aerodynamic, elastic and inertial forces on a structure. It can cause sudden, destructive vibration levels in aircraft, leading in extreme cases to failure of control surfaces or even large sections of the structure. In an aircraft, as the speed of the relative wind increases, there may be a point at which the structural damping is insufficient to damp out the motions which are increasing due to aerodynamic energy being added to the structure.

A widely known solution for damping undesired vibrations consists of having a control surface mass balanced, which could be achieved by placing one or more dead masses forward toward the hinge line, to move the center of gravity of the control surface closer to the hinge line. This kind of mass balanced surface modifies the frequencies and mode shapes of the modes typically involved in the coupling responsible of the flutter phenomenon.

FIG. 1 shows another solution for avoiding the presence of flutter in a control surface (19). The solution consists of adding dead masses (20) in the torsion box (21) of the aerodynamic surface (22). These dead masses modify the frequency and the normal modes having a similar effect than the solution described above.

However, it is known that placing dead masses on the torsion box could be less efficient than having dead masses added to the control surface itself, as more weight is necessary to avoid flutter.

Finally, another solution for avoiding the presence of flutter in a control surface consists of having a control surface partially balanced attaching dead masses to the outboard tip of the control surface. Nevertheless, when rotating the control surface around the hinge line, the dead masses move up and modify the airflow, increasing the aerodynamic drag and, therefore, reducing the efficiency of the control surface.

It would therefore be desirable to provide technical means for providing an aerodynamic surface able to assure a flutter free structure, reduce the weight added by the dead masses and, at the same time, avoid any impact on the aerodynamic drag to thus reduce the fuel consumption and the cost of operation.

SUMMARY OF THE INVENTION

The present invention overcomes the above mentioned drawbacks by providing an aerodynamic surface for an aircraft comprising a torsion box, a movable control surface and a central element, wherein the torsion box comprises a rear spar, an upper cover and a lower cover, and wherein the movable control surface comprises:
  a leading edge,
  a front spar spanwise arranged along the leading edge, having a proximal end and a distal end with respect to the central element,
  a hinge line for rotation,
  a beam having a first end and a second end,
  and, a counterweight attached to the second end of the beam,
  wherein the first end of the beam is attached to the front spar of the control surface, and the second end is projected forward from at least the hinge line of the control surface, so that the counterweight is arranged between the upper and lower covers extending from the rear spar of said torsion box towards the movable control surface.

According to this, the center of gravity of the aerodynamic surface is shifted towards the hinge line, so that the flutter behavior is improved. Hence, this concept is beneficial in terms of the needed forces to move the surface, the loads they will be subjected to, the dynamic behavior of it and, in consequence, the operational costs are reduced.

Further, placing the counterweight between upper and lower covers of the torsion box, the airflow around the control surface will not affect and will not cause any impact on the aerodynamic drag as in other solutions used in the industry. This drag reduction increases the aerodynamic surface efficiency and, thus, the fuel consumption of the aircraft.

Moreover, the counterweight configuration, based on the use of a beam for its support, makes possible the retrofitting of the invention in existing aircraft without the need of a redesign process.

According to a preferred embodiment, the counterweight is located at the distal end of the front spar of the movable control surface. This way, it is possible to reduce the weight of the counterweight needed to assure a flutter free structure, since it is placed in the most efficient position from the aeroelastic point of view. At the same time, reducing the weight of the counterweight added as dead mass helps to reduce the fuel consumption, and the cost of operation.

According to another preferred embodiment, the counterweight is located between the 40%-60% of the total chord length of the aerodynamic surface, and preferably between the 50-60%, in order to produce a higher momentum, and thus reduce the weight added to the structure.

According to another preferred embodiment, the second end of the beam is projected forward from the leading edge of the movable control surface, to thus increase the moment exerted by the counterweight with respect to the hinge line.

This way, the weight of the counterweight may be reduced, thus reducing the weight added to the aircraft and, thus, saving fuel on the operation of the aircraft.

According to another preferred embodiment, the first end of the beam is joined to the front spar of the control surface, and the second end of the beam is joined to the counterweight. This way, the whole assembly is moved all together.

According to another preferred embodiment, the counterweight is metallic, preferably made of high density materials, in order to reduce the size of the counterweight to the minimum.

Another aspect of the invention refers to an aircraft comprising at least one aerodynamic surface as described above. This aerodynamic surface may comprise a horizontal tail plane, a vertical tail plane, or a wing.

BRIEF DESCRIPTION OF THE DRAWINGS

For a better comprehension of the invention, the following drawings are provided for illustrative and non-limiting purposes, wherein.

DETAILED DESCRIPTION OF THE PREFERRED EMBODIMENTS

The invention relates to an aerodynamic surface (11) designed to improve flutter behavior of an aircraft.

Figure 1:
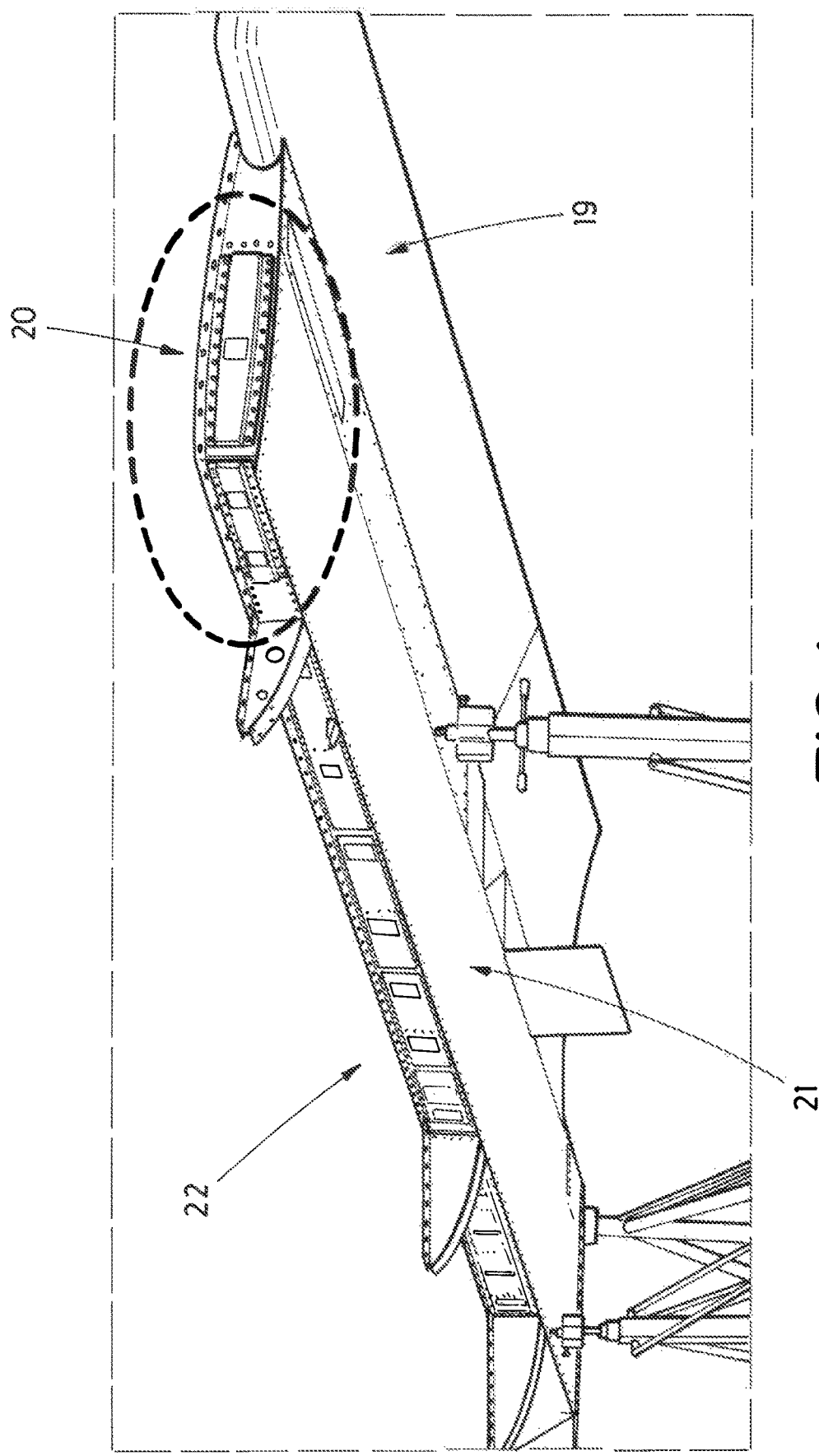
FIG. 1 shows a perspective view of a prior art aerodynamic surface with dead masses attached to the torsion box.
Figure 2:
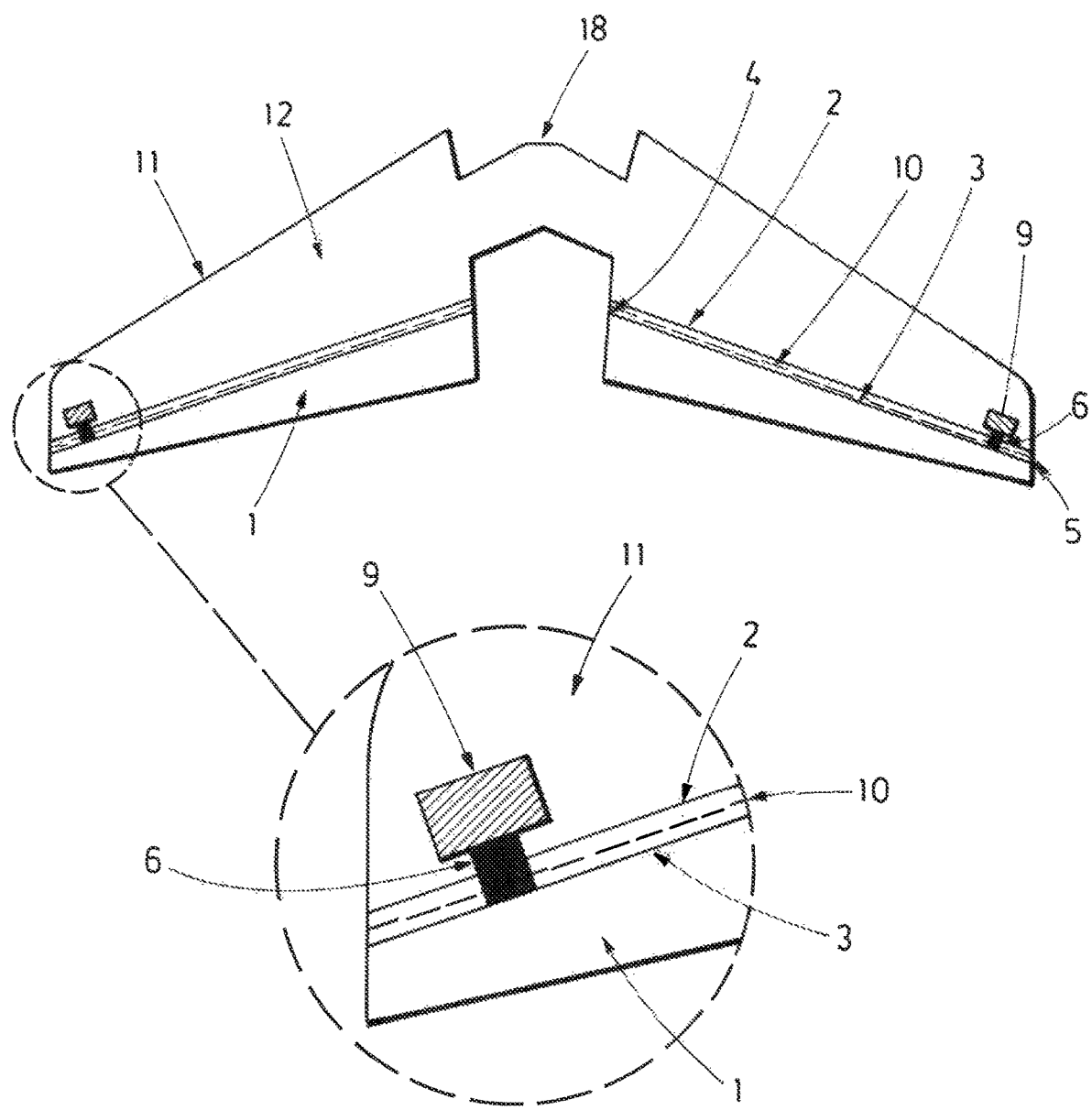
FIG. 2 shows a general view of an aerodynamic surface according to a preferred embodiment of the invention, and a detailed view of the counterweight emplacement.

FIG. 2 shows an aerodynamic surface (11) comprising two sides separated by a central element (18) that may comprise a central joint or a central torsion box. In such a case, the aerodynamic surface (11) may comprise a horizontal tail plane or a wing. Alternatively, the aerodynamic surface (11) may comprise only one side, and the central element (18) may be formed by the junction to the fuselage. In such latter case, the aerodynamic surface (11) comprises a vertical tail plane.

As shown in FIG. 2, each side of the aerodynamic surface (11) comprises a torsion box (12), and a movable control surface (1).

The torsion box (12) comprises a rear spar (13), an upper cover (14) and a lower cover (15).

The movable control surface (1) comprises a leading edge (2), a front spar (3), a hinge line (10), a beam (6), and a counterweight (9).

As shown in the detailed view of FIG. 2, the hinge line (10) is placed between the front spar (3) and the leading edge (2), where the front spar (3) is placed behind the hinge line position, and the leading edge (2) is located beyond (ahead of) the hinge line position, in relation to the aircraft forward flight.

As further shown in the detailed view of FIG. 2, the beam (6) has two ends (7, 8), the first end (7) is joined to the front spar (3) and the second end (8) is joined to the counterweight (9). This way, when the control surface (1) rotates around the hinge line (10), the beam (6) and the counterweight (9) move all together.

Figure 3:
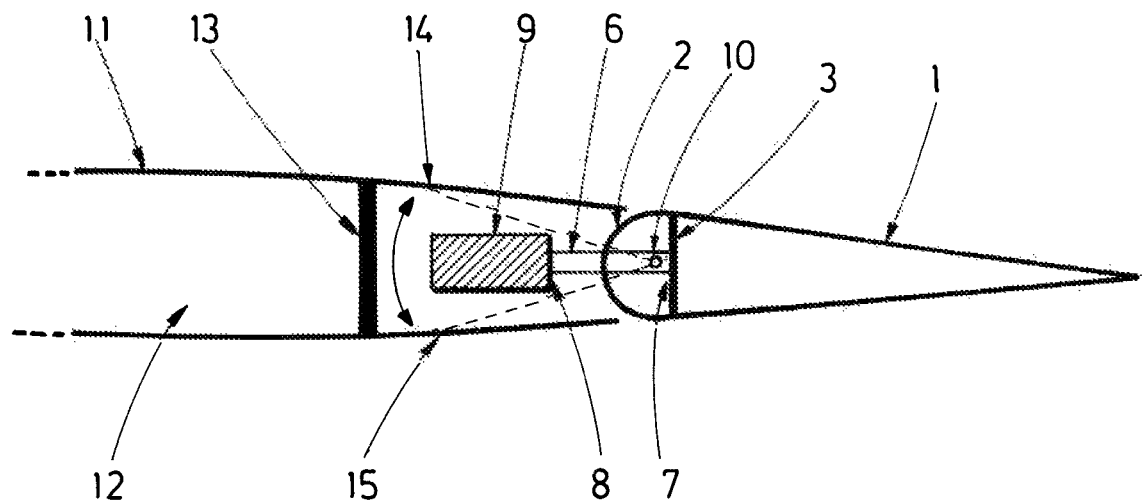
FIG. 3 shows a cross-sectional view of the aerodynamic surface of FIG. 2.

As shown in FIG. 3, the second end (8) of the beam (6) is preferably extended beyond the leading edge (2) of the control surface (1), thus leaving the counterweight (9) located between the rear spar (13) of the torsion box (12) and the leading edge (2) of the control surface (1). This way, the counterweight (9) is housed inside the aerodynamic surface (11), between the upper (14) and the lower covers (15) of the torsion box (12), provided both covers (14, 15) extend beyond the rear spar (13) of the torsion box (12) towards the leading edge (2) of the movable control surface (1). Hence, the counterweight (9) is kept in all operational states of the aircraft between the two covers (14, 15) being not affected by the airflow around the aerodynamic surface (11). With that, the invention avoids the addition of any aerodynamic drag, and maintains the efficiency of the aerodynamic surface (11).

Placing the counterweight (9) beyond the leading edge (2), instead of between the hinge line (10) and the leading edge (2), allows the distance to the hinge line (10) to be greater, thus permitting the counterweight to produce a greater momentum. According to that, the invention is capable of providing the necessary momentum to improve flutter behavior, reducing the weight added to the structure.

Preferably, the beam (6) is arranged in the outermost area of the front spar (3) with respect to the central element, and preferably in its distal end (5) to improve flutter behavior of the aerodynamic surface.

As shown in FIG. 3 and according to another preferred embodiment, the counterweight (9) is located equally spaced between the upper (14) and the lower cover (15), to ensure that the range motion of the control surface (1) is adequate for the operation of the aircraft in both directions, either deflecting the control surface (1) upwards or downwards.

Figure 4:
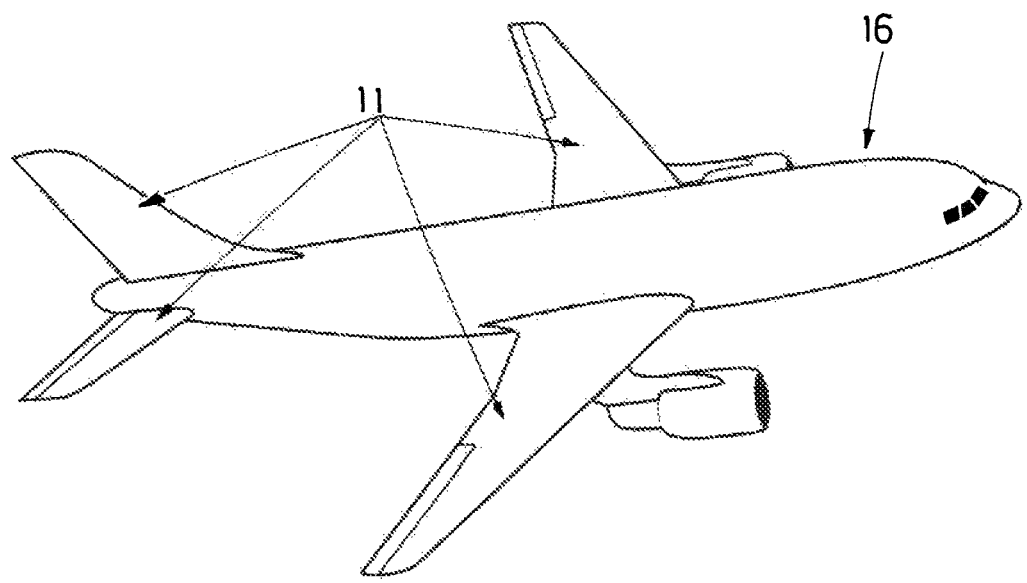
FIG. 4 shows an aircraft having a horizontal tail plane, a wing, and a vertical tail plane according to the invention.

Finally, FIG. 4 shows an aircraft (16) having aerodynamic surfaces (11) as previously described, wherein these aerodynamic surfaces (11) comprise a horizontal tail plane, a vertical tail plane and/or a wing.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerodynamic surface for an aircraft, comprising:
a torsion box,
a movable control surface, and
a central element, the torsion box comprising:
  a rear spar,
  an upper cover and a lower cover, and
the movable control surface comprising:
  a leading edge,
  a front spar spanwise arranged along the leading edge, having a proximal end and a distal end with respect to the central element,
  a hinge line for rotation,
  a beam having a first end and a second end, and
  a counterweight attached to the second end of the beam,
wherein, the first end of the beam is attached to the front spar of the control surface, and the second end is projected beyond at least the hinge line of the control surface so that the counterweight is arranged between portions of the upper and lower covers located between the rear spar of the torsion box and the movable control surface.

2. The aerodynamic surface for an aircraft, according to claim 1, wherein the counterweight is located at the distal end of the front spar of the movable control surface.

3. The aerodynamic surface for an aircraft, according to claim 1, wherein the counterweight is located between 40%-60% of a chord length of the aerodynamic surface.

4. The aerodynamic surface for an aircraft, according to claim 1, wherein the second end of the beam is projected beyond the leading edge of the movable control surface.

5. The aerodynamic surface for an aircraft, according to claim 1, wherein the first end of the beam is joined to the front spar of the control surface, and the second end of the beam is joined to the counterweight.

6. The aerodynamic surface for an aircraft, according to claim 1, wherein the counterweight is metallic.

7. An aircraft comprising at least one aerodynamic surface according to claim 1, wherein said at least one aerodynamic surface comprises a horizontal tail plane.

8. An aircraft comprising at least one aerodynamic surface according to claim 1, wherein said at least one aerodynamic surface comprises a vertical tail plane.

9. An aircraft comprising at least one aerodynamic surface according to claim 1, wherein said at least one aerodynamic surface comprises a wing.

* * * * *